United States Patent [19]

Ikegame

[11] Patent Number: 4,987,565
[45] Date of Patent: Jan. 22, 1991

[54] APPARATUS FOR DRIVING OBJECTIVE LENS

[75] Inventor: Tetsuo Ikegame, Hachioji, Japan

[73] Assignee: Olympus Optical Co., Ltd., Tokyo, Japan

[21] Appl. No.: 299,067

[22] Filed: Jan. 19, 1989

[30] Foreign Application Priority Data

Jan. 22, 1988 [JP] Japan .................................. 63-10939
Jan. 25, 1988 [JP] Japan .................................. 63-12488

[51] Int. Cl.$^5$ ................................................ G11B 7/00
[52] U.S. Cl. ................................................ 369/44.15
[58] Field of Search ................. 369/44.14, 44.15, 44.16

[56] References Cited

U.S. PATENT DOCUMENTS

| | | | |
|---|---|---|---|
| 4,092,529 | 5/1978 | Aihara et al. | 369/44.15 |
| 4,679,904 | 7/1987 | Kurihara | 369/44.16 |
| 4,767,187 | 8/1988 | Gijzen et al. | 369/44.15 |
| 4,924,199 | 5/1990 | Hashimoto et al. | 369/44.11 |

Primary Examiner—Robert L. Richardson
Attorney, Agent, or Firm—Parkhurst, Wendel & Rossi

[57] ABSTRACT

An apparatus for driving an objective lens in focusing and tracking directions for projecting a light beam upon an information track on an optical record medium, including a lens holder for holding the objective lens, resilient wires for supporting the lens holder movably in the focusing and tracking directions, a focusing coil wound on the lens holder, two pairs of tracking coils secured to opposite side walls of the lens holder, said opposite side walls being aligned in a track direction, permanent magnets each arranged to be faced to respective side walls, and a yoke having upright portions arranged to face respective magnets. In order to suppress an undesired rolling resonance, forces generated at first portions of tracking coils in the tracking direction are selectively increased or forces generated at second portions of tracking coils in the focusing direction are selectively decreased.

9 Claims, 9 Drawing Sheets

APPARATUS FOR DRIVING OBJECTIVE LENS

BACKGROUND OF THE INVENTION

Field of the Invention and Related Art Statement

The present invention relates to an apparatus for driving an objective lens for use in reading and writing information out of and onto an optical record medium.

There has been developed an optical information reading and writing apparatus for reproducing and recording information out of and onto an optical record medium by projecting a focused spot of a light beam upon the record medium. In such an optical information reading and writing apparatus, the information is read out and recorded on the record medium along an information track with the aid of an optical head which includes an objective lens for projecting the light beam spot upon the record medium, a mechanism for supporting the objective lens movably in a tracking direction as well as in a focusing direction, and an apparatus for driving the objective lens in the tracking and focusing directions in accordance with tracking error and focusing error, respectively. It should be noted that the tracking direction is perpendicular both to the optical axis of the objective lens and to the track direction in which the information track extends, and the focusing direction is in parallel with the optical axis of the objective lens. When use is made of an optical record disc, the information track is formed as a spiral track or concentric circular tracks. Then, the tracking direction is a tangential direction of the spiral or circular track. The above mentioned objective lend driving apparatus has been proposed in, for example, Japanese Patent Publications Kokai Sho Nos. 59-221,839, 62-149,044, 62-149,045 and 62-149,047.

Figure 1:
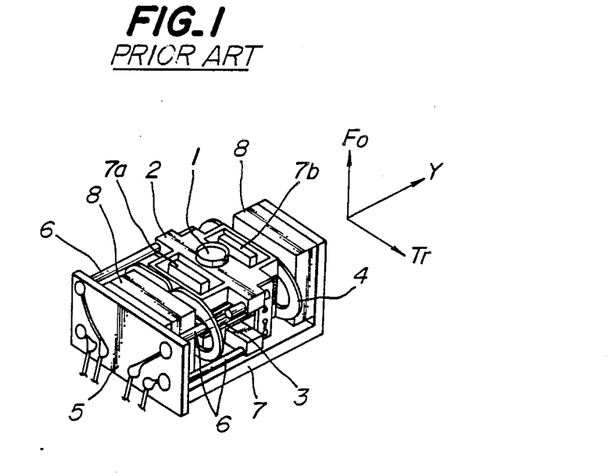
FIG. 1 is a perspective view showing the known objective lens driving apparatus.
Figure 2:
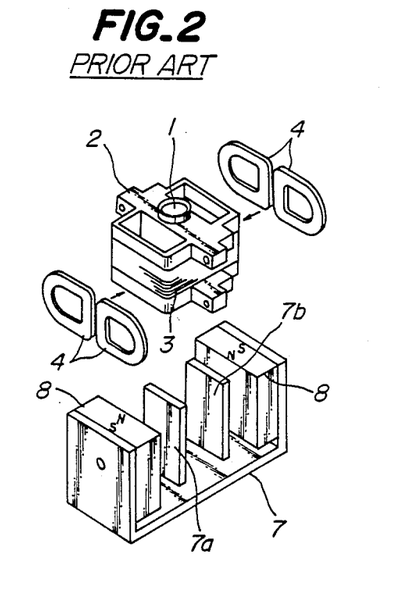
FIG. 2 is an exploded perspective view illustrating mainly the electromagnetic driving device of the apparatus shown in FIG. 1.

FIGS. 1 and 2 show a known objective lens driving apparatus disclosed in the Japanese Patent Publication Kokai Sho No. 59-221,839. An objective lens 1 is supported by a lens holder 2, and a focusing coil 3 is wound around the outer side wall of the holder 2. On opposite sides of the holder which are aligned in the track direction are applied respective pairs of tracking coils 4. The holder 2 is connected to a base 5 by means of four resilient wires movably both in the focusing direction and in the tracking direction. To the base 5 is secured a yoke 7 having upright portions 7a, 7b, and permanent magnets 8 are secured to end plates of the yoke. The holder 2 and the yoke 7 are assembled such that portions of the focusing and tracking coils 3 and 4 are situated in magnetic fields formed between the upright portions 7a, 7b of yoke 7 and permanent magnets 8. By conducting electric currents corresponding to the focusing and tracking errors through the focusing and tracking coils 3 and 4, respectively, the holder 2 and thus the objective lens 1 are moved in the focusing and tracking directions, so that the correctly focused light spot is projected on the information track of the optical record medium.

In the known objective lens driving apparatus described above, the movable portion including the objective lens 1, holder 2 and coils 3 and 4 might be rotated about an axis (Y-axis) which is in parallel with the track direction and is perpendicular both to the focusing direction (FO) and to the tracking direction (Tr). Hereinafter this rotating movement is called the rolling resonance. In order to suppress the rolling resonance, there has been proposed to make a center of tracking force acting upon the tracking coils 4 in the tracking direction coincident with the center of gravity (G) of the movable portion so that any moment about the Y-axis could not be generated.

However, even if the center of tracking force is made coincident with the center of gravity of the movable portion, when the movable portion is moved or shifted in the focusing direction due to the focusing servo control, the equivalent center of tracking force is shifted from the center of gravity so that the rolling resonance is generated, because the magnetic flux density in the magnetic gap in which the tracking coils are moved has such a distribution that the magnetic flux density is decreased toward the upper and lower ends of the magnetic gap.

Figure 3:
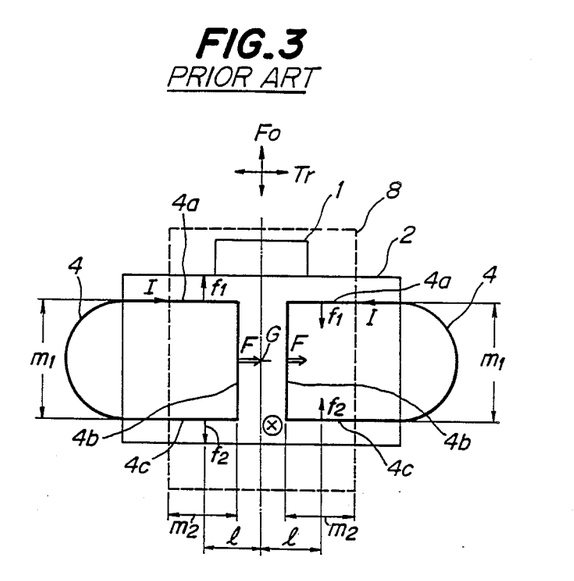
FIGS. 3 and 4 are schematic side views of the apparatus shown in FIG. 1 for explaining the generation of the rolling resonance.
Figure 4:
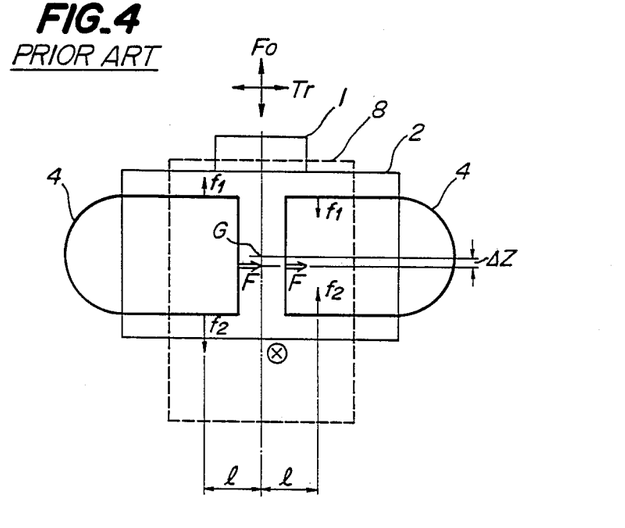

Now the generation of the rolling resonance will be further explained in detail. FIGS. 3 and 4 are schematic views showing the objective lens 1, holder 2, tracking coils 4 and permanent magnet 8 viewed in the Y-axis. The magnetic gap is situated in front of the permanent magnet 8 and is extended in parallel with the plane of the drawing. G denotes the center of gravity of the movable portion comprising the objective lens 1, holder 2, focusing and tracking coils 3 and 4. When an electric current I is conducted through the tracking coils 4 in directions shown by arrows in FIG. 3, in portions 4b of the tracking coils 4 which portions extend in the focusing direction Fo there are generated forces F in the tracking direction Tr, and at the same time in portions 4a and 4c which extend in the tracking direction Tr there are produced forces $f_1$ and $f_2$, respectively in the focusing direction Fo. As illustrated in FIG. 3, when a center of the forces F is coincided with a direction which passes through the center of gravity G and is in parallel with the tracking direction Tr and the forces $f_1$ and $f_2$ have the same magnitude, there is not produced any moment about the Y-axis, so that the movable portion is shifted only in the tracking direction Tr without causing the undesired rolling resonance.

Figure 5:
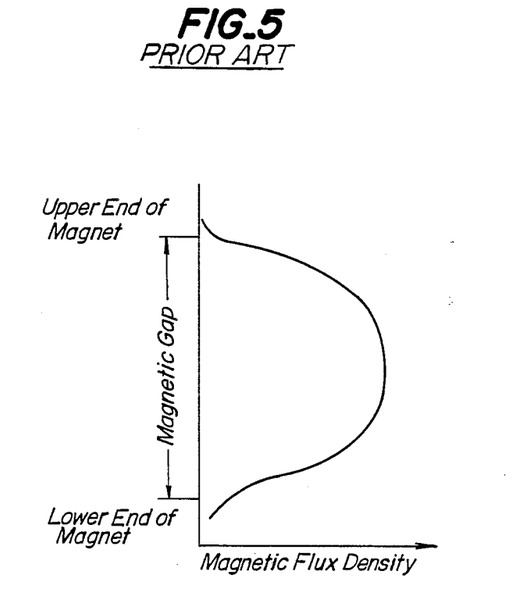
FIG. 5 is a graph representing the distribution of the magnetic flux density in the magnetic gap of the apparatus illustrated in FIG. 1.

However, when the movable portion is shifted in the focusing direction Fo, the force $f_1$ becomes decreased, but the force $f_2$ becomes increased, so that $f_1 < f_2$, because the distribution of the magnetic flux density in the magnetic gap is decreased abruptly toward the upper and lower ends of the permanent magnet 4 as depicted in FIG. 5. Further, the center of the force F is shifted downward by a distance $\Delta Z$ as illustrated in FIG. 4 with respect to the center of gravity G. Since the forces $f_1$ and $f_2$ have the opposite directions, the two sets of tracking coils 4 are subjected to a moment $M_1$ which is equal to $2(f_2 - f_1)l$, wherein $l$ is a distance between the center of gravity G and the center points of the forces $f_1$ and $f_2$ measured in the tracking direction Tr. Moreover, due to the shift $\Delta Z$ of the movable portion, there is also produced a moment $M_2$ amounting to $2F \cdot \Delta Z$. Since the above mentioned moments $M_1$ and $M_2$ have the same direction, there is produced the very large rolling resonance. That is to say, the movable portion is subjected to the rolling resonance which is caused by a sum of the two moments $M_1$ and $M_2$. This influence can be expressed by an equivalent shift $\Delta Z'$ of the point of the force F with respect to the center of gravity G, said equivalent shift $\Delta Z'$ being calculated as follows:

$$\Delta Z' = \frac{(M_1 + M_2)}{2F} = (f_2 - f_1)\frac{l}{F} + \Delta Z.$$

When the equivalent shift $\Delta Z'$ becomes large, there is generated a large rolling resonance. It should be noted that the above explained rolling resonance is equally generated when the movable portion is shifted downward in FIG. 3, but the direction of the rolling resonance is inverted.

In the known objective lens driving apparatus just explained above, it is difficult to suppress the generation of the undesired rolling resonance effectively, so that the phase in the frequency characteristic of the tracking servo control fluctuates and the tracking control could not be carried out correctly. Therefore, the yield of the objective lens driving apparatus becomes reduced. In order to solve the above problem, one may consider to increase the height of the magnetic gap such that the central portion of the distribution curve of magnetic flux density has a flat portion and the tracking coils are moved within this flat central portion. However, this solution might induce another problem that the height of the yoke 7 and permanent magnets 8 has to be increased, and thus the height of the whole apparatus could not be made small.

SUMMARY OF THE INVENTION

The present invention has for its object to provide a novel and useful apparatus for driving an objective lens without causing the undesired rolling resonance.

According to the invention, an apparatus for driving an objective lens which is used to project a light beam onto an information track on an optical record medium including a lens holder for holding the objective lens, a supporting means for supporting the lens holder movably in first and second directions which are orthogonal to each other, at least one coil secured to the lens holder and a magnetic means for generating a magnetic flux passing through said coil to generate a force acting in the first direction, the improvement being characterized in that a first force generated at a first portion of the coil which first portion extends in said second direction is increased relative to a second force generated at a second portion of the coil, said second portion extending in the first direction.

DESCRIPTION OF THE PREFERRED EMBODIMENTS

Figure 6:
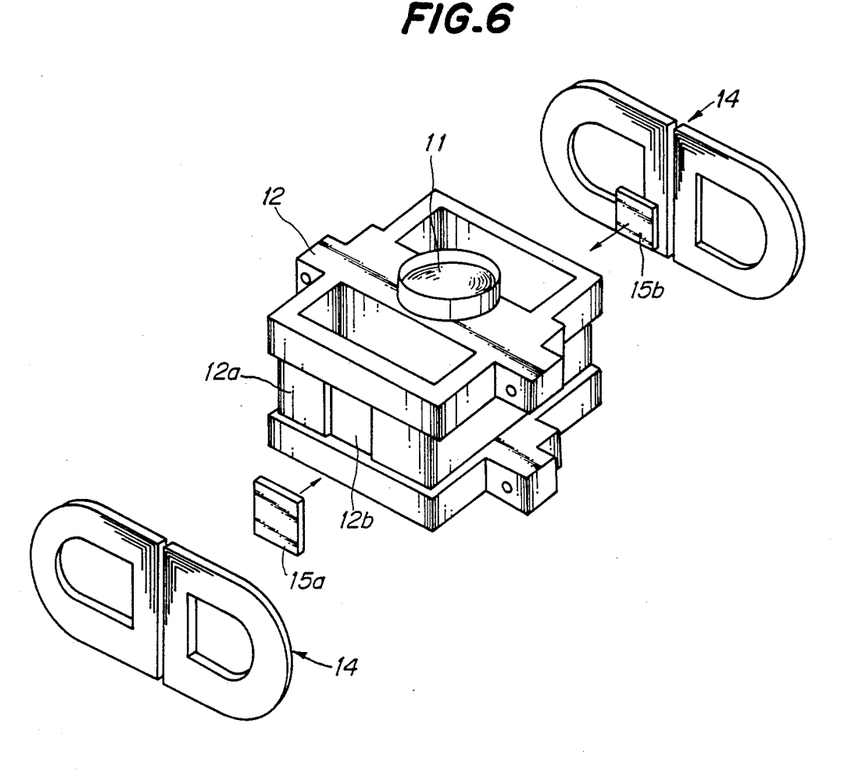
FIG. 6 is an exploded perspective view showing a first embodiment of the objective lens driving apparatus according to the invention.
Figure 7:
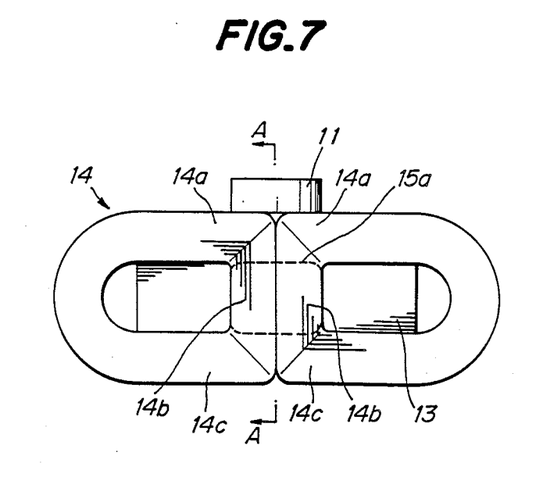
FIG. 7 is a side view of the apparatus of FIG. 6.
Figure 8:
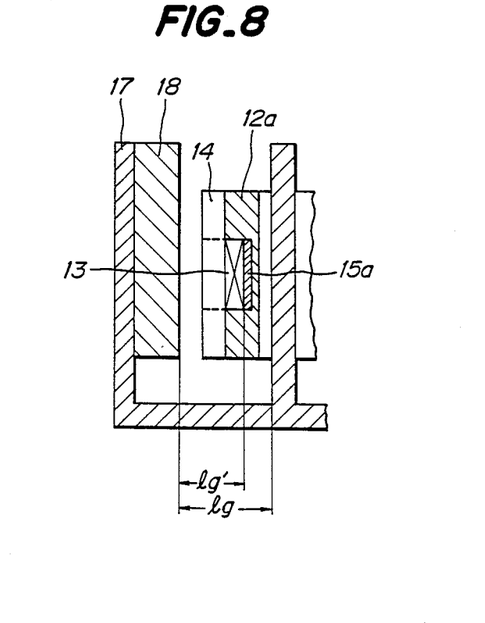
FIG. 8 is a cross sectional view cut along a line A—A in FIG. 7.

FIGS. 6 to 8 show a first embodiment of the objective lens driving apparatus according to the invention. FIG. 6 is an exploded perspective view, FIG. 7 is a side view and FIG. 8 is a cross sectional view cut along a line A—A in FIG. 7. An objective lens 11 for projecting a light beam upon an optical record medium not shown is secured to a lens holder 12. Around the side wall 12a of the holder 12 is wound a focusing coil 13 (see FIGS. 7 and 8) and rectangular plates 15a and 15b made of magnetic material are clamped into and adhered to recesses 12b formed in opposite side walls of the holder 12, said opposite side walls being aligned in the track direction which is perpendicular both to the optical axis of the objective lens 11 and to the direction of information rack on the record medium. The focusing coil 13 is wound over the magnetic plates 15a, 15b. Two pairs of tracking coils 4 are secured to the opposite side walls of the holder 12 by means of an adhesive agent. In the present embodiment, the tracking coil pair is shaped in the form of glasses. The magnetic plates 15a, 15b are provided at portions 14b of the tracking coils 14 which portions generate the force in the tracking direction, but are not existent at portions 14a, 14c which produce the force in the focusing direction. As illustrated in FIG. 8, to a yoke 17 made of magnetic material is secured a permanent magnet 18 with the aid of an adhesive agent. By supplying electric currents to the focusing and tracking coils 13 and 14, the holder 12 and thus the objective lens 11 are moved in the focusing and tracking directions, respectively.

Figure 9:
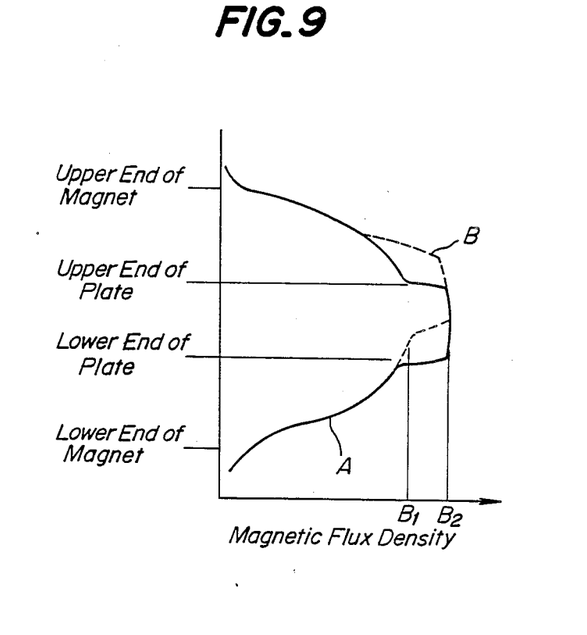
FIG. 9 is a graph showing the distribution of the magnetic flux density in the magnetic gap of the apparatus shown in FIG. 7.

FIG. 9 shows a graph of the distribution of magnetic flux density within the magnetic gap defined by the upper and lower ends of the permanent magnets 18. A solid curve A illustrates the magnetic flux density distribution when the movable portion including the objective lens 11, holder 12, focusing and tracking coils 13 and 14, and magnetic plates 15a, 15b, is not shifted, and a broken curve B represents the distribution of magnetic flux density when the movable portion is shifted upward in the focusing direction. As shown in FIG. 8, a magnetic gap lg' at the magnetic plate 15a is shorter than a magnetic gap lg at the remaining portion, so that the magnetic flux density at the magnetic plate is locally high. When the movable portion is shifted upward, the magnetic flux density at the magnetic plates 15a, 15b is remained high. Therefore, the portions 14b of the tracking coils 14 are always subjected to the high magnetic flux density, and thus the force F generated at this portions 14b becomes large relative to that generated at the portions 14a, 14c. That is to say, by providing the magnetic plates 15a, 15b selectively at the portions 14b of the tracking coils 14, the forces $f_1$, $f_2$ generated in the focusing direction at the portions 14a, 14c are not changed, but the forces F produced in the tracking direction at the portions 14b are selectively increased. As explained above, the equivalent shift $\Delta Z'$ can be expressed by $\Delta Z' = (f_2 - f_1)l/F + \Delta Z$, and when the force F is exclusively increased with respect to the forces $f_1$ and $f_2$, $\Delta Z'$ becomes small, and thus the rolling resonance can be suppressed.

In the embodiment so far explained, the magnetic flux density is locally increased at the portions 14b of the tracking coils 14 by securing the rectangular magnetic plates 15a, 15b to the holder 12 at the portions 14b. It should be noted that the same effect can be attained by other means. For instance, the shape of the magnetic plates may be any shapes other than rectangular. Further, the number of magnetic plates may be one, three or more than three.

In the above embodiment, the force F applying in the tracking direction is exclusively increased in order to reduce the equivalent shift $\Delta Z'$. According to another aspect of the invention, the same effect may be attained by decreasing the forces $f_1$, $f_2$ acting in the focusing direction with respect to the force F.

Figure 10:
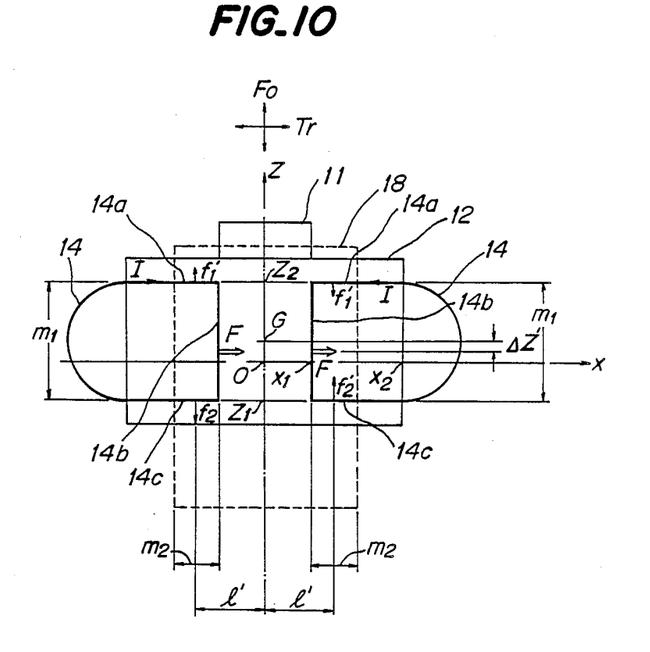
FIG. 10 is a schematic side view illustrating a second embodiment of the objective lens driving apparatus according to the invention.

FIG. 10 is a schematic side view showing a second embodiment of the objective lens driving apparatus according to the invention. In the present embodiment, portions similar to those of the previous embodiment are illustrated by the same reference numbers used in FIGS. 6 to 8. In FIG. 10, the movable portion is shown to be shifted in the rightward. In the present embodiment, the portions 14a, 14b of the tracking coils 14 which extend in the tracking direction Tr have a short length $m_2$ as compared with the known apparatus illustrated in FIGS. 1 to 4. A length $m_1$ of the portions 14b of the tracking coils 14 extending in the focusing direction Fo is the same as that of the known apparatus. Now the forces applied to the movable portion will be explained. The tracking direction is denoted by X-axis, the focusing direction is in the Z-axis. An origin (X, Z) = (0, 0) of the coordinate system is set to the center of gravity G when the movable portion is not shifted in the focusing direction. Now the magnetic flux density is represented by B (X, Z), then moments $M_1$ and $M_2$ acting about the center of gravity G due to the forces applied to the portions 14a, 14c of tracking coils 14 may be expressed as follows.

$$M_{11} = \int_{x_1}^{x_2} X \cdot B(X, Z_2) dX$$

and $$M_{12} = \int_{x_1}^{x_2} X \cdot B(X, Z_1) dX$$

Therefore, the total moment $M_1$ generated about the center of gravity G due to the forces generated at the portions 14a, 14c of the two tracking coils 14 may be expressed in the following manner.

$$M_1 = 2(M_{12} - M_{11}) = 2 \int_{x_1}^{x_2} X\{B(X, Z_1) - B(X, Z_2)\} dX$$

The total length of portions of the tracking coil 14 which are situated in the effective magnetic gap may be represented by $m_1 + 2m_2$. Now, there is defined a ratio $\alpha$ of the length $m_1$ of the portion 14b of the tracking coil 14 which generates the force F acting in the tracking direction Tr to the total length $m_1 + 2m_2$, i.e.

$$\alpha = \frac{m_1}{m_1 + 2m_2}.$$

Figure 11:
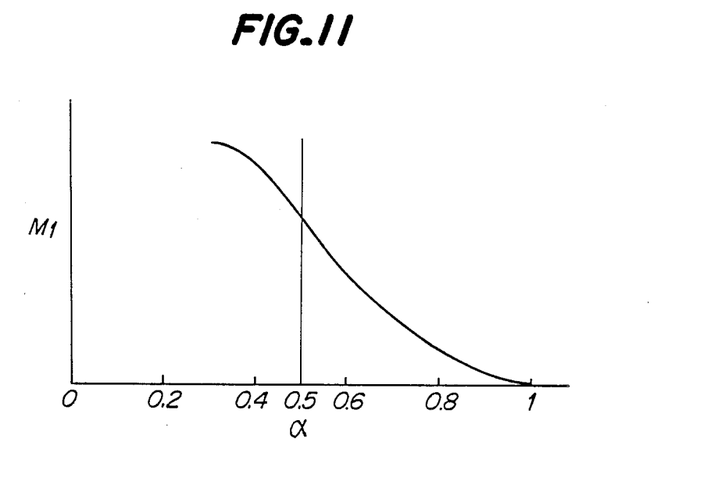
FIG. 11 is a graph representing the variation of the moment about the center of gravity in accordance with the value of $\alpha$.

FIG. 11 is a graph showing the variation of the moment $M_1$ about the center of gravity G with respect to $\alpha$ which varies from 0.35 to 1.0. As can be seen from FIG. 11, the moment $M_1$ is decreased in accordance with the increase in $\alpha$. When $\alpha$ exceeds 0.45, the moment $M_1$ is reduced abruptly, and when $\alpha = 1$, the moment $M_1$ becomes zero. When $\alpha = 0.5$, the moment $M_1$ is decreased by about 30% of that at $\alpha = 0.35$. In order to suppress the rolling resonance sufficiently, $\alpha$ is preferably made larger than 0.5. That is to say, in order to suppress the undesired rolling resonance it is preferable to form the tracking coil 14 such that the length $m_1$ of the portion 14b is longer than twice of the length $m_2$ of the portions 14a, 14c.

Figure 12:
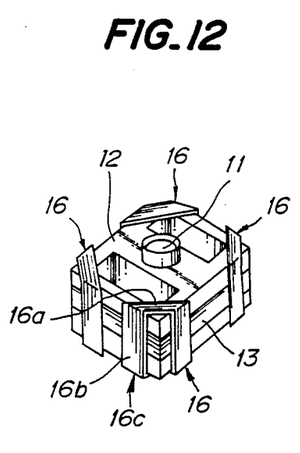
FIGS. 12, 13 and 14 are perspective views illustrating third, fourth and fifth embodiments, respectively of the objective lens driving apparatus according to the invention.

FIG. 12 is a perspective view showing a third embodiment of the objective lens driving apparatus according to the invention. In the present embodiment, tracking coils 16 are wound on corners of a cubic holder 12 such that portions 16a, 16c which serve to generate forces in the focusing direction situate on upper and lower surfaces of the holder 12. Then effective length of the portions 16a, 16c generating the forces in the focusing direction can be reduced, and thus the value of $\alpha$ can be increased. Further, the tracking coil portions 16a, 16c situate in the magnetic gap at portions having lower magnetic flux density, so that the forces generated by these portions 16a, 16c are further reduced. In this manner, the rolling resonance can be suppressed to a large extent.

Figure 13:
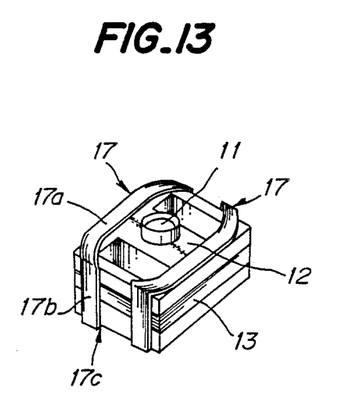

FIG. 13 is a perspective view illustrating a fourth embodiment of the objective lens driving apparatus according to the invention. In this embodiment, two tracking coils 17 are wound on the holder 12 such that portions 17b are arranged on opposite side walls of the holder and portions 17a, 17c are provided on upper and lower surfaces of the holder.

Figure 14:
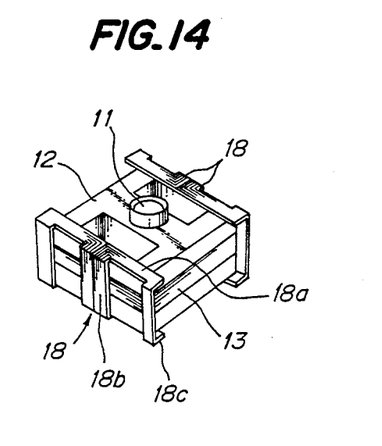

FIG. 14 is a perspective view depicting a fifth embodiment of the objective lens driving apparatus, in which rectangular tracking coils 18 are wound on the holder 12 such that portions 18a, 18c are bent over the upper and lower surfaces of the holder 12. Also in the fourth and fifth embodiments, the rolling resonance can be reduced efficiently.

Figure 15:
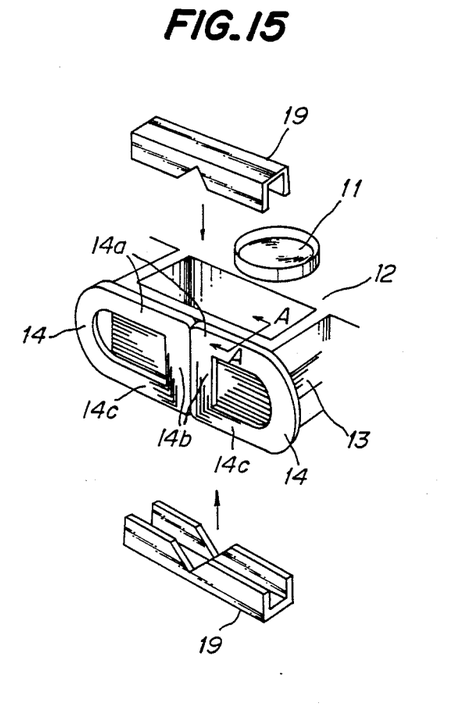
FIG. 15 is an exploded perspective view showing a sixth embodiment of the objective lens driving apparatus according to the invention.
Figure 16:
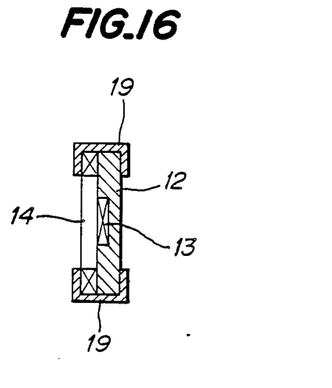
FIG. 16 is a cross sectional view cut along a line A—A in FIG. 15.

FIGS. 15 and 16 show a sixth embodiment of the objective lens driving apparatus according to the invention. In this embodiment, shielding plates 19 made of magnetic material such as iron are provided on the holder 12 and tracking coils 14 such that the plates cover the portions 14a, 14c of tracking coil 14. In this construction, the portions 14a, 14c of the tracking coils 14 are shielded by the plates 19 from the magnetic flux, so that the effective length of these portions 14a, 14c is reduced, and the rolling resonance can be suppressed materially.

The present invention is not limited to the embodiments explained above, but many modifications and alternations may be conceived by those skilled in the art within the scope of the invention. In the above embodiments, the movable portion including the objective lens, lens holder and coils is supported movably in the focusing and tracking directions by means of four resilient wires, but the movable portion may be supported with the aid of any other supporting means. Further, the tracking coils may be formed in any desired shape. Moreover, in the above embodiments, the invention is applied to the apparatus for driving the objective lens in the tracking direction, but the invention may be equally applied to the apparatus for driving the objective lens in the focusing direction or tangential, i.e. track direction.

What is claimed is:

1. An apparatus for driving an objective lens which is used to project a light beam onto an information track on an optical record medium including a lens holder for holding the objective lens, a supporting means for supporting the lens holder movably in first and second directions which are substantially orthogonal to each other, at least one coil secured to the lens holder and a magnetic means for generating a magnetic flux passing through said coil to generate a force acting in the first direction, the improvement being characterized in that a first force generated at a first portion of the coil which first portion extends in said second direction is increased relative to a second force generated at a second portion of the coil, said second portion extending in the first direction.

2. An apparatus according to claim 1, wherein said first force is exclusively increased, while said second force is remained unchanged.

3. An apparatus according to claim 2, wherein at least one magnetic member is provided on the lens holder at such a position that the magnetic member is faced to said first portion of the coil.

4. An apparatus according to claim 1, wherein said second force is exclusively decreased, while the first force is remained unchanged.

5. An apparatus according to claim 4, wherein an effective length $m_1$ of said first portion of coil is longer than an effective length $m_2$ of said second portion of coil.

6. An apparatus according to claim 5, wherein the effective length $m_1$ is longer than twice the effective length $m_2$.

7. An apparatus according to claim 4, wherein said lens holder is formed as a rectangular cube and said coil is wound on the lens holder such that the second portion of coil is provided on a surface of the lens holder, said surface being substantially perpendicular to the second direction.

8. An apparatus according to claim 7, wherein said coil is wound at a corner of the lens holder.

9. An apparatus according to claim 4, wherein said second portion of coil is shielded by a magnetic member.

* * * * *